UNITED STATES PATENT OFFICE.

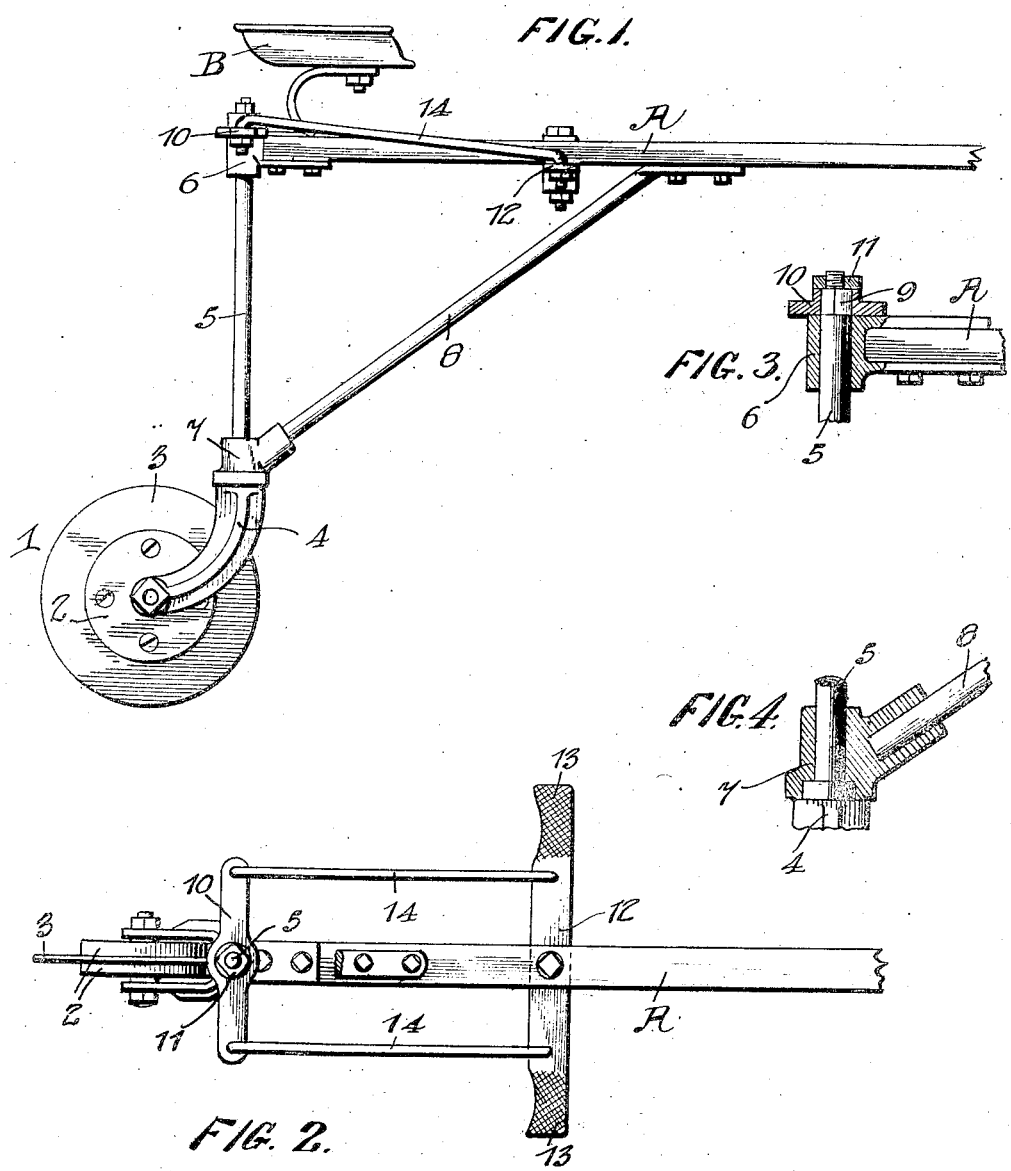

GEORGE E. GORDON, OF SHENANDOAH, IOWA.

GUIDING DEVICE FOR WHEELED AGRICULTURAL IMPLEMENTS.

No. 879,864.   Specification of Letters Patent.   Patented Feb. 25, 1908.

Application filed July 30, 1907. Serial No. 386,310.

*To all whom it may concern:*

Be it known that I, GEORGE E. GORDON, a citizen of the United States, residing at Shenandoah, in the county of Page and State of Iowa, have invented certain new and useful Improvements in a Guiding Device for Wheeled Agricultural Implements, of which the following is a specification.

My invention relates to a guiding device for cultivators and other wheeled agricultural implements and particularly contemplates the provision of a simple and inexpensive arrangement for a ready guidance of the machine, and which may be readily actuated by the operator from his seat upon the machine.

My invention further and specifically resides in the following features of construction, arrangement and operation as will be herein-after described with reference to the accompanying drawing, forming a part of this specification, in which like numerals are used to designate like parts throughout the several figures, and in which Figure 1 is an elevation of my improved guiding device illustrating its attachment to a frame carrying an operator's seat, Fig. 2 is a top plan view of the same, the seat having been broken away, Fig. 3 is a detail sectional view illustrating the upper bearing of the vertical shaft carrying a guide wheel at its lower end, and Fig. 4 is a detail sectional view illustrating the lower bearing of the vertical shaft.

In the practical embodiment of my invention I provide a guiding wheel 1 comprising an enlarged hub portion 2, a circular cutting disk 3 extending centrally from said hub portion and adapted to cut through the soil and to allow the hub portion 2 to travel upon the surface thereof. The guiding wheel 1 is journaled within the lower open free ends of the caster forks 4 rigidly secured at their upper ends to a vertical shaft 5. The shaft 5 is preferably secured within the frame of the wheeled agricultural implement, and I have shown the same rotatively mounted at its upper end to bracket 6 secured to and extending from a central bar A of a wheeled frame, upon which is also mounted a seat B. The shaft 5 is further supported to rotate freely within the socket 7 carried by a slanted supporting rod 8 attached at its upper end upon the under side of said central bar A of the frame. The vertical shaft 5 is further provided at its upper end above the bracket 6 with a squared portion 9 upon which is located a transversely extending lever 10 having a squared opening therethrough centrally of its ends, adapted to fit about said squared portion 9 of the shaft 5 to rotate the same when said lever is oscillated, said shaft 5 being threaded above said lever 10 and adapted to receive a nut 11 thereon to hold the same in place. The second oscillatory lever 12 is pivoted centrally beneath the central bar A and is provided with extensions 13 therefrom on which the operator's feet rest when said operator is sitting upon seat B. Levers 10 and 12 are connected by means of the connecting rods 14 extending therebetween parallel and on each side of the central bar A and adapted to transmit movement from the foot lever 12 to oscillate the lever 10 and to rotate the shaft 5 and operate the guiding wheel 1 as desired.

Having thus fully described my invention, I claim:

In a guiding attachment for wheeled agricultural implements, the combination with the seat bar of the implement having a bearing formed at its rear end, and a slanting brace bar extending downwardly from said seat bar and formed with a bearing at its lower end in alinement with said bearing of said bar, of a vertical shaft rotatively journaled in said bearings and extending therethrough, said shaft having a threaded upper end and a squared portion adjacent said threaded end and above said seat bar, and having caster forks secured upon its lower end below said brace bar bearing, a caster wheel journaled to rotate within said forks, a transverse lever having a central squared opening fitting about said squared portion of said shaft, a nut for engagement upon said threaded portion to hold said lever, an operating foot lever pivotally mounted centrally of its length upon said seat bar, and a pair of connecting rods extending between said operating lever and said transverse lever, parallel with and on each side of said seat bar, substantially as described.

In testimony whereof I affix my signature in presence of two witnesses.

GEORGE E. GORDON.

Witnesses:
 THOMAS MCMAHON,
 EARL R. FERGUSEN.